US012680909B2

(12) United States Patent
Li et al.

(10) Patent No.: US 12,680,909 B2
(45) Date of Patent: Jul. 14, 2026

(54) METHOD AND DEVICE FOR PUMPING START TEST FOR PUMPED STORAGE ENGINE, AND APPARATUS

(71) Applicant: CSG POWER GENERATION CO., LTD. MAINT. AND TEST CO., Guangzhou (CN)

(72) Inventors: Qing Li, Guangzhou (CN); Yu Gong, Guangzhou (CN); Peng Ling, Guangzhou (CN); Yakang Zhao, Guangzhou (CN); Xiangdong Liu, Guangzhou (CN); Yalin Jia, Guangzhou (CN); Hao Wu, Guangzhou (CN); Liangliang Nie, Guangzhou (CN)

(73) Assignee: CSG POWER GENERATION CO., LTD. MAINT. AND TEST CO., Guangzhou (CN)

( * ) Notice: Subject to any disclaimer, the term of this patent is extended or adjusted under 35 U.S.C. 154(b) by 292 days.

(21) Appl. No.: 18/704,968

(22) PCT Filed: Oct. 31, 2023

(86) PCT No.: PCT/CN2023/128559
§ 371 (c)(1),
(2) Date: Apr. 26, 2024

(87) PCT Pub. No.: WO2024/216916
PCT Pub. Date: Oct. 24, 2024

(65) Prior Publication Data
US 2025/0110020 A1      Apr. 3, 2025

(30) Foreign Application Priority Data
Apr. 21, 2023      (CN) .......................... 202310430690.3

(51) Int. Cl.
*G01M 15/00*            (2006.01)

(52) U.S. Cl.
CPC .................................. *G01M 15/00* (2013.01)

(58) Field of Classification Search
CPC ........ G01M 15/00; G01M 15/02; Y02E 10/20
See application file for complete search history.

(56) References Cited

U.S. PATENT DOCUMENTS 4,468,167 A * 8/1984 Ogiwara ................. F03B 15/04
                                                    415/910
4,816,696 A * 3/1989 Sakayori ................. F03B 15/06
                                                    322/14

(Continued)

FOREIGN PATENT DOCUMENTS

CN        101430358 A        5/2009
CN        101430358 B   * 12/2010

(Continued)

OTHER PUBLICATIONS

International Search Report for corresponding PCT Application No. PCT/CN2023/128559, dated Feb. 4, 2024, 3 pages.

(Continued)

*Primary Examiner* — Francis C Gray
(74) *Attorney, Agent, or Firm* — Taft, Stettinius & Hollister LLP

(57)                    ABSTRACT
A method and device for a pumping start test for a pumped storage engine, and an apparatus are disclosed. The method includes: obtaining a switch state of guide vanes of the pumped storage engine; controlling the pumping start of the engine to enter a first stage according to the switch state of the guide vanes, and obtaining parameters related to the first stage, to determine a first-stage test result; controlling the pumping start of the engine to enter a second stage according to the first-stage test result, and obtaining parameters related to the second stage, to determine a second-stage test result; controlling the pumping start of the engine to enter a third stage according to the second-stage test result, and obtaining (Continued)

parameters related to the third stage to determine a final test result. The first stage, the second stage and the third stage correspond to different speeds of the engine.

10 Claims, 6 Drawing Sheets

(56)                    References Cited

U.S. PATENT DOCUMENTS

| | | | | |
|---|---|---|---|---|
| 2010/0107748 | A1* | 5/2010 | Feldges | F04B 51/00 |
| | | | | 702/24 |
| 2019/0078572 | A1* | 3/2019 | Sewell | F04D 13/10 |
| 2019/0113039 | A1* | 4/2019 | Raine | E03B 7/075 |
| 2019/0379317 | A1 | 12/2019 | Kandler et al. | |
| 2024/0003350 | A1* | 1/2024 | Niskanen | H02P 1/04 |

FOREIGN PATENT DOCUMENTS

| | | | | |
|---|---|---|---|---|
| CN | 115660222 | A | * | 1/2023 |
| CN | 115980566 | A | | 4/2023 |
| CN | 116147921 | A | | 5/2023 |
| EP | 1014054 | A2 | | 6/2000 |

OTHER PUBLICATIONS

Written Opinion for corresponding PCT Application No. PCT/CN2023/128559, dated Feb. 4, 2024, 4 pages.

* cited by examiner

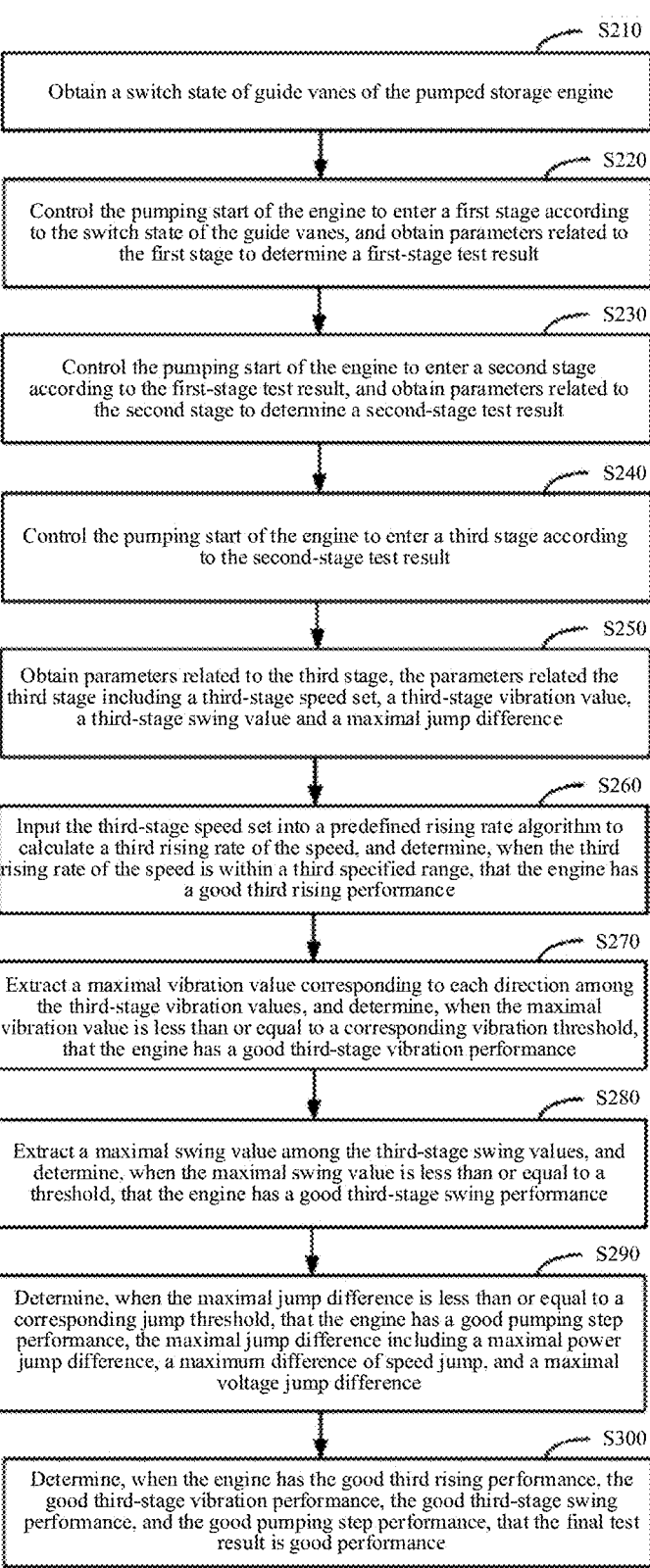

S210

Obtain a switch state of guide vanes of the pumped storage engine

S220

Control the pumping start of the engine to enter a first stage according to the switch state of the guide vanes, and obtain parameters related to the first stage to determine a first-stage test result

S230

Control the pumping start of the engine to enter a second stage according to the first-stage test result, and obtain parameters related to the second stage to determine a second-stage test result

S240

Control the pumping start of the engine to enter a third stage according to the second-stage test result

S250

Obtain parameters related to the third stage, the parameters related the third stage including a third-stage speed set, a third-stage vibration value, a third-stage swing value and a maximal jump difference

S260

Input the third-stage speed set into a predefined rising rate algorithm to calculate a third rising rate of the speed, and determine, when the third rising rate of the speed is within a third specified range, that the engine has a good third rising performance

S270

Extract a maximal vibration value corresponding to each direction among the third-stage vibration values, and determine, when the maximal vibration value is less than or equal to a corresponding vibration threshold, that the engine has a good third-stage vibration performance

S280

Extract a maximal swing value among the third-stage swing values, and determine, when the maximal swing value is less than or equal to a threshold, that the engine has a good third-stage swing performance

S290

Determine, when the maximal jump difference is less than or equal to a corresponding jump threshold, that the engine has a good pumping step performance, the maximal jump difference including a maximal power jump difference, a maximum difference of speed jump, and a maximal voltage jump difference

S300

Determine, when the engine has the good third rising performance, the good third-stage vibration performance, the good third-stage swing performance, and the good pumping step performance, that the final test result is good performance

FIG. 5

METHOD AND DEVICE FOR PUMPING START TEST FOR PUMPED STORAGE ENGINE, AND APPARATUS

CROSS-REFERENCE TO RELATED APPLICATIONS

This application is the national phase under 35 U.S.C. § 371 of PCT International Application No. PCT/CN2023/128559, which has an international filing date of Oct. 31, 2023 and claims priority of Chinese patent application No. 2023104306903. The entireties of both applications are incorporated by reference herein for all purposes.

TECHNICAL FIELD

The present disclosure relates to the field of engine-testing technologies, and more particularly, to a method and a device for a pumping start test for a pumped storage engine, and an apparatus.

BACKGROUND

Variable-speed pumped storage engines are classified as three categories: full power, doubly fed and variable pole. Compared with conventional fixed-speed pumped storage engines, variable-speed pumped storage engines have the advantages of wider operating range, higher efficiency, strong self-starting ability and stronger pump power adjustment capability.

At present, the method for the pumping start test for the pumped storage engines is only of the fixed speed category. Once the rising rate of the speed of the engine and the opening rate of the guide vanes are not coordinated well, it is easy to cause large engine vibration, and in severe cases, it makes the engine have large shaft eccentricity or even causes a touch between a stator and a rotor, which makes the safety and stability in the process of the test unable to be guaranteed.

SUMMARY

The present disclosure provides a method and a device for a pumping start test for a pumped storage engine, and an apparatus, to test the cooperation between the speed and the opening degree of the guide vane, which can ensure the safety and stability of the pumping start process of the pumped storage engine.

According to an aspect of the present disclosure, a method for a pumping start test for a pumped storage engine is provided. The method includes:

obtaining a switch state of guide vanes of the pumped storage engine;

controlling the pumping start of the engine to enter a first stage according to the switch state of the guide vanes, and obtaining parameters related to the first stage, to determine a first-stage test result, the parameters related to the first stage including a voltage, a current and a first-stage speed set;

controlling the pumping start of the engine to enter a second stage according to the first-stage test result, and obtaining parameters related to the second stage, to determine a second-stage test result, the parameters related to the second stage including a second-stage speed set, a second-stage vibration value and a second-stage swing value; and controlling the pumping start of the engine to enter a third stage according to the second-stage test result, and obtaining parameters related to the third stage to determine a final test result, the first stage, the second stage and the third stage corresponding to different speeds of the engine, and the parameters related to the third stage including a third-stage speed set, a third-stage vibration value, a third-stage swing value and a maximal jump difference.

Optionally, controlling the pumping start of the engine to enter the first stage according to the switch state of the guide vanes includes: determining whether the switch state of the guide vanes indicates that the guide vanes are closed, and controlling, if the switch state of the guide vanes indicates that the guide vanes are closed, the speed of the engine to increase to a first specified speed directly through a converter, to enable the pumping start of the engine to enter the first stage; and controlling, if the switch state of the guide vanes does not indicate that the guide vanes are closed, the guide vanes to be closed through a governor, and controlling, when the switch state of the guide vanes indicates that the guide vanes are closed, the speed of the engine to increase to the first specified speed through the converter, to enable the pumping start of the engine to enter the first stage.

Optionally, obtaining the parameters related to the first stage, to determine the first-stage test result includes: calculating a product of a voltage and a current for each phase to obtain a power for each phase, and determining, when the power for each phase is negative, that the engine has a normal conversion; inputting the first-stage speed set into a predefined rising rate algorithm to calculate a first rising rate of the speed, and determining, when the first rising rate of the speed is within a first specified range, that the engine has a good first rising performance; and determining, when the engine has the normal conversion and the good first rising performance, that the first-stage test result is good performance.

Optionally, controlling the pumping start of the engine to the second stage according to the first-stage test result includes: controlling, when the first-stage test result is good performance, the speed of the engine to increase from a first specified speed to a second specified speed through a converter, to enable the pumping start of the engine to the second stage.

Optionally, obtaining the parameters related to the second stage, to determine the second-stage test result includes: inputting the second-stage speed set into a predefined rising rate algorithm to calculate a second rising rate of the speed, and determining, when the second rising rate of the speed is within a second specified range, that the engine has a good second rising performance; extracting a maximal vibration value corresponding to each direction among the second-stage vibration values, and determining, when the maximal vibration value is less than or equal to a corresponding vibration threshold, that the engine has a good second-stage vibration performance; extracting a maximal swing value among the second-stage swing values, and determining, when the maximal swing value is less than or equal to a threshold, that the engine has a good second-stage swing performance; and determining, when the engine has the good second rising performance, the good second-stage vibration performance, and the good second-stage swing performance, that the second-stage test result is good performance.

Optionally, controlling the pumping start of the engine to enter a third stage according to the second-stage test result, includes: controlling, when the second-stage test result is good performance, the speed of the engine to increase from a second specified speed to a third specified speed through a converter and a governor, to enable the pumping start of the engine to enter the third stage.

Optionally, obtaining the parameters related to the third stage to determine the final test result includes: inputting the third-stage speed set into a predefined rising rate algorithm to calculate a third rising rate of the speed, and determining, when the third rising rate of the speed is within a third specified range, that the engine has a good third rising performance; extracting a maximal vibration value corresponding to each direction among the third-stage vibration values, and determining, when the maximal vibration value is less than or equal to a corresponding threshold, that the engine has a good third-stage vibration performance; extracting a maximal swing value among the third-stage swing values, and determining, when the maximal swing value is less than or equal to a threshold, that the engine has a good third-stage swing performance; determining, when the maximal jump difference is less than or equal to a corresponding jump threshold, that the engine has a good pumping step performance, the maximal jump difference including a maximal power jump difference, a maximum difference of speed jump, and a maximal voltage jump difference; and determining, when the engine has the good third rising performance, the good third-stage vibration performance, the good third-stage swing performance, and the good pumping step performance, that the final test result is good performance.

According to another aspect of the present disclosure, a device for a pumping start test for a pumped storage engine is provided. The device includes:

a guide vane switch state obtaining module configured to obtain a switch state of guide vanes of the pumped storage engine;

a first-stage test result determination module configured to control the pumping start of the engine to enter a first stage according to the switch state of the guide vanes, and obtain parameters related to the first stage, to determine a first-stage test result, the parameters related to the first stage including a voltage, a current and a first-stage speed set;

a second-stage test result determination module configured to control the pumping start of the engine to enter a second stage according to the first-stage test result, and obtain parameters related to the second stage, to determine a second-stage test result, the parameters related to the second stage including a second-stage speed set, a second-stage vibration value and a second-stage swing value; and a final test result determination module configured to control the pumping start of the engine to enter a third stage according to the second-stage test result, and obtain parameters related to the third stage to determine a final test result, the first stage, the second stage and the third stage corresponding to different speeds of the engine, and the parameters related to the third stage including a third-stage speed set, a third-stage vibration value, a third-stage swing value and a maximal jump difference.

According to a further aspect of the present disclosure, an electronic apparatus is provided. The electronic apparatus includes:

at least one processor; and a memory communicatively connected to the at least one processor.

The memory stores a computer program executable by the at least one processor, and the computer program, when executed by the at least one processor, causes the at least one processor to implement the method for the pumping start test for the pumped storage engine in any embodiment of the preset disclosure.

According to a further aspect of the present disclosure, a computer-readable storage medium is provided. The computer-readable storage medium stores computer instructions configured to cause, when executed by a processor, the processor to implement the method for the pumping start test for the pumped storage engine in any embodiment of the preset disclosure.

It should be understood that the content described in this section is not intended to identify key or important features of the embodiments of the present disclosure, nor is it intended to limit the scope of the present disclosure. Other features of the present disclosure will be readily understood from the following description.

BRIEF DESCRIPTION OF THE DRAWINGS

To describe the technical solutions in the embodiments of the present disclosure more clearly, the following briefly describes the accompanying drawings required to describe the embodiments. Apparently, the accompanying drawings in the following description show merely some embodiments of the present disclosure, and persons of ordinary skill in the art may still obtain other drawings based on these accompanying drawings without creative efforts.

FIG. 5 is a flow diagram illustrating another method for the pumping start test for the pumped storage engine provided according to a second embodiment of the present disclosure.

DETAILED DESCRIPTION OF THE EMBODIMENTS

In order to enable persons of ordinary skill in the art to better understand technical solutions proposed in the present disclosure, the technical solutions in the embodiments of the present disclosure will be clearly and completely described below with reference to the accompanying drawings in the embodiments of the present disclosure. It is clear that the described embodiments are only some but not all of the embodiments of the present disclosure. Based on the embodiments of the present disclosure, all other embodiments obtained by persons of ordinary skill in the art without creative efforts should fall within the scope of protection of the present disclosure.

It should be noted that the terms "first", "second" and the so on in the description and claims of the present disclosure and the above-mentioned drawings are used to distinguish between different objects but do not indicate a particular order. It should be understood that the numbers used as such may be interchanged where appropriate so that the embodiments of the present disclosure described herein can be implemented in an order other than those illustrated or described herein. In addition, the terms "include", "have" and any variations thereof are intended to cover non-exclusive inclusions. For example, a process, a method, a system, a product, or a device that includes a series of steps or units is not limited to the listed steps or units, but optionally further includes an unlisted step or unit, or optionally further includes another inherent step or unit of the process, the method, the product, or the device.

First Embodiment

Figure 1:
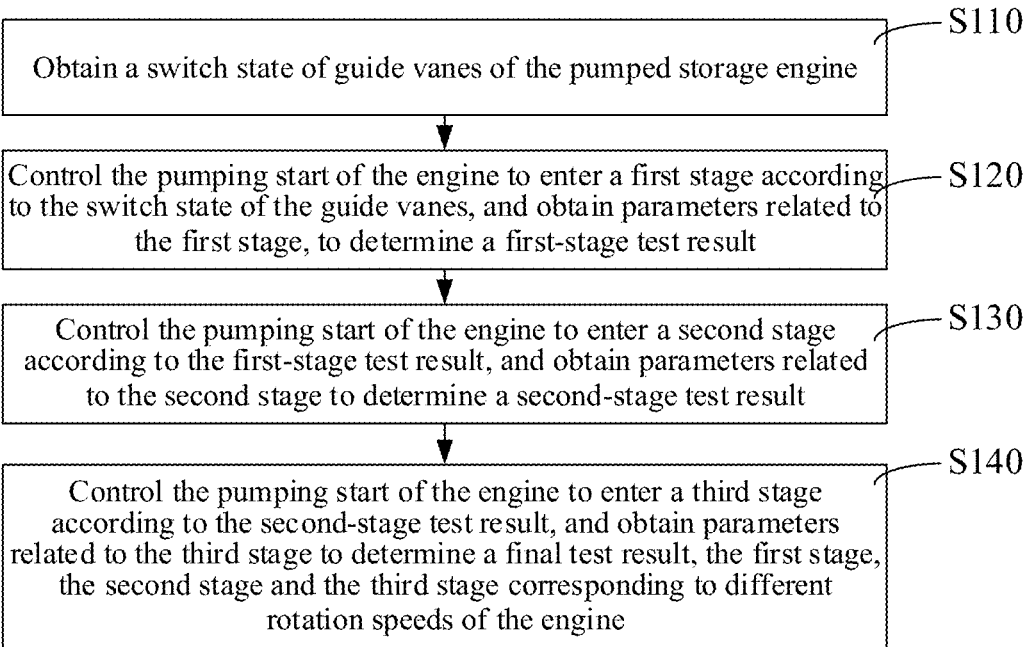
FIG. 1 is a flow diagram illustrating a method for a pumping start test for a pumped storage engine according to a first embodiment of the present disclosure.

FIG. 1 is a flow diagram illustrating a method for a pumping start test for a pumped storage engine according to a first embodiment of the present disclosure. This embodiment can be applied to the pumping start for the pumped storage engine. The method can be performed by a device for the pumping start test for the pumped storage engine. The device for the pumping start test for the pumped storage engine can be implemented in the form of hardware and/or software. The device for the pumping start test for the pumped storage engine can be configured in a computer. As shown in FIG. 1, the method includes the following steps.

In step S110, a switch state of guide vanes of the pumped storage engine is obtained.

Figure 2:
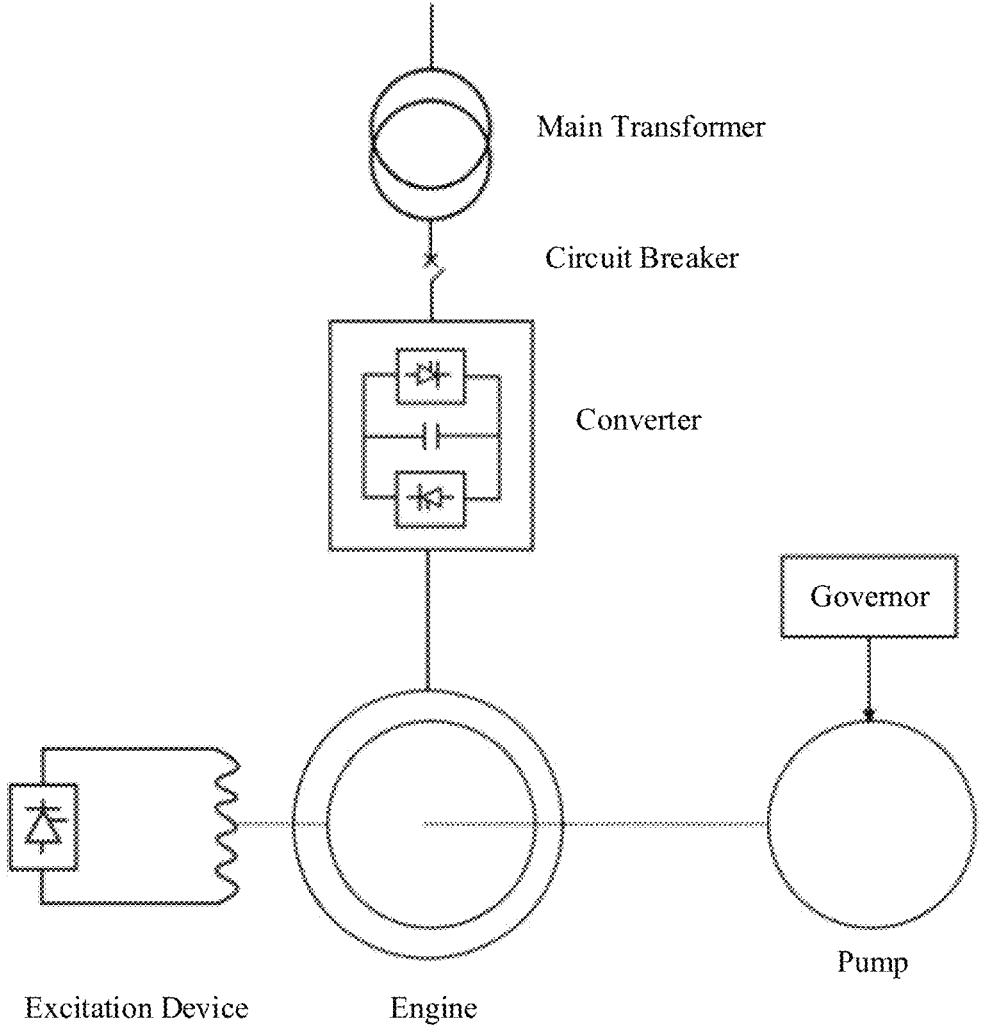
FIG. 2 is a schematic diagram illustrating a configuration of a pumping start system according to the first embodiment of the present disclosure.

FIG. 2 is a schematic diagram illustrating a configuration of a pumping start system provided by the first embodiment of the present disclosure. FIG. 2 shows a full-power pumping start engine and its ancillary devices. The engine refers to a machine capable of converting electrical energy into mechanical energy. In this embodiment, the engine has both pumping working conditions and power generation working conditions. A three-phase stator is connected to a converter, and a rotor is connected to a rectifier excitation device. In the pumping working conditions, the converter supplies an alternating rotating magnetic field to the stator, which drives the rotor to increase speed, causing a pump that rotates coaxially with the rotor to rotate, thereby causing the pump to pump water. The pump is a machine that transports liquid or pressurizes liquid. The pump is mainly adopted to transport liquid including water, oil, acid or alkali solution, emulsified liquid, suspension emulsion and liquid metal. The pump can also transport a mixture of liquid and gas, and liquid containing suspended solids. In this embodiment, the pump mainly includes guide vanes, a runner, a water guide mechanism, etc. A rotating shaft of the runner is connected to a large shaft of the rotor. In the pumping conditions, the rotor drives the large shaft of the runner to rotate, and the guide vanes open to pump water. An excitation device mainly including an AC-DC rectifier bridge is used to supply a constant DC current to the rotor to make the rotor rotate in the alternating rotating magnetic field in the pumping conditions. A governor is a device that controls the input force and speed of the pump by controlling an opening degree of the guide vanes. The converter includes an AC-DC-AC bridge, with an insulated gate bipolar transistor (IGBT)

acting as a core component. An end of the converter is connected to a power grid, and is supplied with a constant input voltage of the same frequency as the power grid (50 Hz). Another end of the converter is connected to the stator of the engine and outputs a variable frequency voltage. During the pumping start process, the converter is supplied with the voltage of the power grid at a constant frequency (50 Hz), and outputs an alternating magnetic field of a frequency rising from 0 to the stator, to drive the rotor to rotate. A circuit breaker is a switch that connects the power grid and the motor, and a device capable of switching on a normal load current and switching off a fault current. For example, it can be a vacuum circuit breaker or an SF6 circuit breaker. A main transformer is a device that transmits electrical energy and converts voltage levels.

In step S120, the pumping start of the engine is controlled to enter a first stage according to the switch state of the guide vanes, and parameters related to the first stage are obtained, to determine a first-stage test result.

Figure 3:
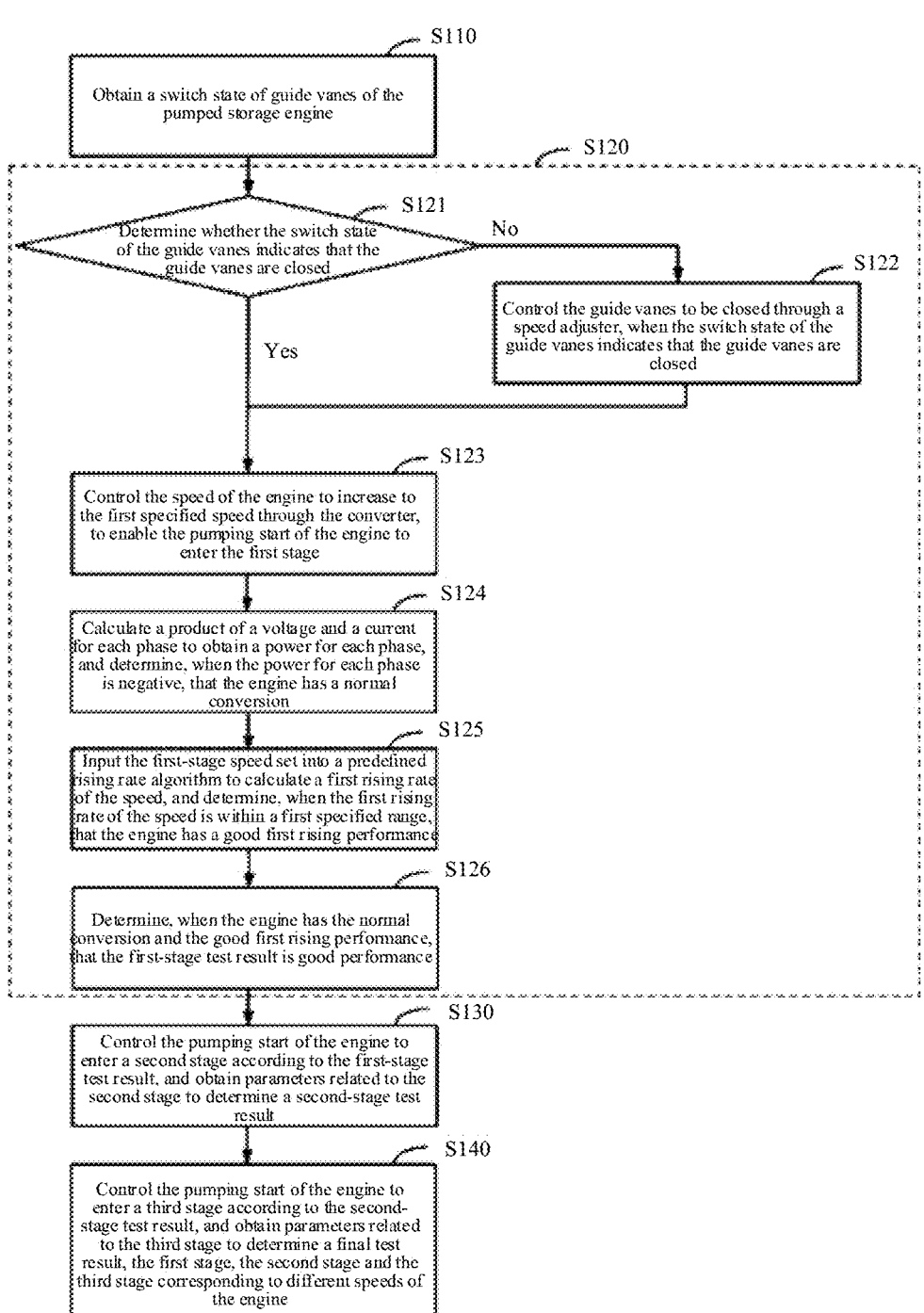
FIG. 3 is a flow diagram illustrating another method for the pumping start test for the pumped storage engine according to the first embodiment of the present disclosure.

FIG. 3 is a flow diagram illustrating the method for the pumping start test for the pumped storage engine provided according to the first embodiment of the present disclosure. The step S120 mainly includes the following steps S121 to S126.

The parameters related to the first stage includes a voltage, a current and a first-stage speed set.

In step S121, it is determined whether the switch state of the guide vanes indicates that the guide vanes are closed. If so, proceed to step S123; otherwise, proceed to step S122.

In step S122, the guide vanes are controlled to be closed through a governor. When the switch state of the guide vanes indicates that the guide vanes are closed, proceed to step S123.

In step S123, the speed of the engine is controlled to increase to the first specified speed through the converter, to enable the pumping start of the engine to enter the first stage.

Specifically, a switch can be formed at the position of the guide vane structure of the pump to detect whether the guide vanes are closed, i.e., the opening degree of the guide vanes is 0. If the opening degree of the guide vanes is not 0, the governor is activated to control the opening degree of the guide vanes to be 0. If the opening degree of the guide vanes is 0, the converter controls the speed of the engine to increase, and a gear speed sensor installed on a central rotating shaft of the engine is used to detect the speed in real time. The first specified speed is set by a user according to the engine performance. For example, the first specified speed can be 20% Ne (Ne is a rated speed). If the speed does not reach the first specified speed, the converter will continue to control the speed of the engine to increase. If the speed increases to the first specified speed, the pumping start of the engine is determined to reach the first stage.

In step S124, a product of a voltage and a current for each phase is calculated to obtain a power for each phase. When the power for each phase is negative, it is determined that the engine has a normal conversion.

Specifically, a current transformer (with an accuracy level of 0.5) and a voltage transformer (with an accuracy level of 0.5) installed on the stator side of the engine are used to calculate the product of the voltage and the current for each phase to obtain the power for each phase. For example, three-phase voltages of UA, UB, and UC, and three-phase currents of IA, IB, and IC are obtained. Then the powers of $PA=UA*IA$, $PB=UB*IB$, and $PC=UC*IC$ are calculated. If PA, PB and PC are negative, it is determined that the engine has the normal conversion. If at least one of the powers is positive, it is determined that the engine has an incorrect conversion.

In step S125, the first-stage speed set is input into a predefined rising rate algorithm to calculate a first rising rate of the speed. When the first rising rate of the speed is within a first specified range, it is determined that the engine has a good first rising performance.

Specifically, when the speed of the engine increases to the first specified speed, the speed is recorded every 1000 ms, to form into a speed set $N_1=(t_n, N_n)$, where $t_n$ refers to data collected at the $n^{th}$ time interval, and $N_n$ refers to a $n^{th}$ speed. A single rising rate of the speed is calculated using the following formula (1):

$$K_{n-1} = \frac{N_n - N_{n-1}}{n-1}, \tag{1}$$

where $K_{n-1}$ refers to a $n-1^{th}$ rising rate of the speed, $N_n$ refers to a $n^{th}$ speed, ands $N_{n-1}$ refers to a $n-1^{th}$ speed. After calculating each single rising rate of the speed, the following formula (2) can be used to calculate the rising rate of the speed:

$$K = \frac{K_1 + K_2 + \ldots + K_{n-1}}{n-1}, \tag{2}$$

where $K_1$ refers to a $1^{st}$ rising rate of the speed, $K_{n-1}$ refers to a $n-1^{th}$ rising rate of the speed. Finally, the first rising rate of the speed can be calculated. The first specified range of the rising rate of the speed may be [20, 30]. If the calculated first rising rate of the speed is within the first specified range, it can be determined that the first rising performance of the engine is good. If the first rising rate of the speed does not fall within the first specified range, it indicates that the first rising performance of the engine is poor.

In step S126, when the engine has the normal conversion and the good first rising performance, it is determined that the first-stage test result is good performance.

Specifically, when the engine has the normal conversion and the good first rising performance, it indicates that the first stage test performance of the engine is good. When the engine has an abnormal conversion or the first rising performance is poor, it is necessary to shut down the engine and optimize parameters of the converter before starting test again.

In step S130, the pumping start of the engine is controlled to enter a second stage according to the first-stage test result, and parameters related to the second stage are obtained to determine a second-stage test result.

Figure 4:
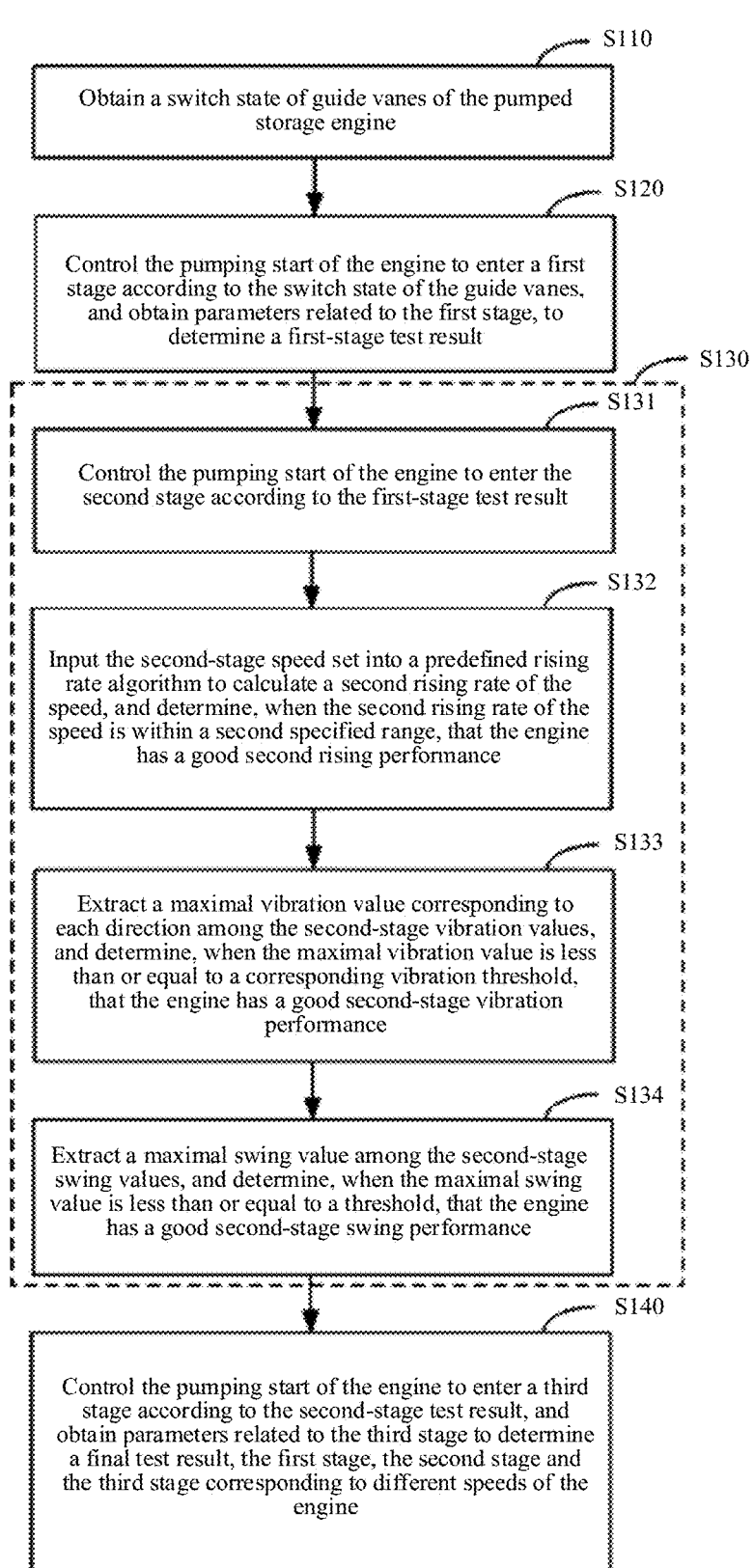
FIG. 4 is a flow diagram illustrating another method for the pumping start test for the pumped storage engine provided according to the first embodiment of the present disclosure.

FIG. 4 is a flow diagram illustrating the method for the pumping start test for the pumped storage engine according to the first embodiment of the present disclosure. The step S130 mainly includes the following steps S131 to S134.

The parameters related to the second stage include a second-stage speed set, a second-stage vibration value and a second-stage swing value.

In step S131, the pumping start of the engine is controlled to enter the second stage according to the first-stage test result.

Optionally, controlling the pumping start of the engine to enter the second stage according to the first-stage test result includes: controlling, when the first-stage test result is good performance, the speed of the engine to increase from the first specified speed to the second stage through the converter, to enable the pumping start of the engine to enter the second stage.

Specifically, when the engine has the normal conversion and the good first rising performance, it indicates that the first stage test performance of the engine is good. In this case, a constant speed rise control strategy can be adopted to control the engine to enter the second stage through the converter. The second specified speed can be 90%-92% Ne.

In step S132, the second-stage speed set is input into a predefined rising rate algorithm to calculate a second rising rate of the speed. When the second rising rate of the speed is within a second specified range, it is determined that the engine has a good second rising performance.

Specifically, the second-stage speed set can be input into the predefined rising rate algorithm, i.e., according to formula (1) and formula (2), the second rising rate of the speed can be calculated, and the second specified range can be [25,35]. When the second rising rate of the speed is within the second specified range, it is determined that the second rising performance of the engine is good. When the second rising rate of the speed does not fall within the second specified range, it is determined that the second rising performance of the engine is poor, and it is necessary to shut down the engine and optimize the parameters of the converter before starting test again.

In step S133, a maximal vibration value corresponding to each direction among the second-stage vibration values is extracted. When the maximal vibration value is less than or equal to a corresponding vibration threshold, it is determined that the second-stage vibration performance of the engine is good.

Specifically, when the vibration performance of the engine is evaluated, vibration sensors in a X direction and a Y direction can be installed at a top cover of the pump. The number of the sensors in each direction can be 3 to 5. During the process of the speed of the engine increasing from the first specified speed to the second specified speed, the vibration measurements from each sensor are monitored and recorded in real time, and the maximal vibration value Xa in the X direction and the maximum value Ya in the Y direction are extracted. The vibration threshold can be set. For example, the vibration threshold in the X direction can be 0.5 mm, and the vibration threshold in the Y direction can be 0.6 mm. When the maximal vibration value is less than or equal to the corresponding vibration threshold, it is determined that the second-stage vibration performance of the engine is good. When the maximal vibration value is greater than the corresponding vibration threshold, it is determined that the second-stage vibration performance of the engine is poor. In this case, it is necessary to shut down and inspect the engine and structural components of the pump.

In step S134, a maximal swing value among the second-stage swing values is extracted. When the maximal swing value is less than or equal to a threshold, it is determined that the second-stage swing performance of the engine is good.

Specifically, when the swing performance of the engine is evaluated, swing sensors can be installed at a rotating shaft of the pump. The number of the sensors can be 4 to 6. In the process of the speed of the engine increasing from the first specified speed to the second specified speed, the swing measurements from each sensor are monitored and recorded in real time, and the maximal swing value is obtained. The swing threshold can be 0.751, where 1 is the shaft clearance. When the maximal swing value is less than or equal to the threshold, it is determined that the second-stage swing performance of the engine is good. When the maximal swing value is greater than the threshold, it is determined that the second-stage swing performance of the engine is poor. In this case, it is necessary to shut down and inspect the engine and structural components of the pump.

In step S135, when the engine has the good second rising performance, the good second-stage vibration performance, and the good second-stage swing performance, it is determined that the second-stage test result is good performance.

Further, during the processing of the second-stage test, if at least one of the above test results is poor, it indicates that the second-stage test result is poor, and the shutdown and inspection are required in this case.

In step S140, the pumping start of the engine is controlled to enter a third stage according to the second-stage test result, and parameters related to the third stage are obtained to determine a final test result. The first stage, the second stage and the third stage correspond to different speeds of the engine.

When the second-stage test result is good performance, the engine can continue to be controlled to enter the third stage. The parameters related to the third stage include a third-stage speed set, a third-stage vibration value, a third-stage swing value and a maximal jump difference.

It should be noted that a characteristic formula control strategy of the speed and the guide vane is adopted from the second stage to the third stage, and the following formula (3) is adopted to calculate the opening degree of the guide vanes:

$$v = 2.12x + 0.85Ne, \tag{3}$$

where v refers to the speed of the engine, x refers to the opening degree of the guide vanes, and Ne refers to rated speed of the engine. The opening degree of the guide vanes is calculated to match the speed, to further determine the final test result based on the parameters related to the third stage.

In the technical solution provided by the embodiment of the present disclosure, by changing the speed of the engine in the process of the test, the rising rate of the speed of the engine is ensured to match the opening rate of the guide vanes, to avoid large shaft eccentricity of the engine and touch between a stator and a rotor of the engine, which are caused by large vibration of the engine, and to ensure the safety and stability in the process of the test.

Second Embodiment

FIG. 5 is a flow diagram illustrating a method for a pumping start test for a pumped storage engine according to a second embodiment of the present disclosure. In this embodiment, based on the above-mentioned first embodiment, the process of controlling the pumping start of the engine to enter the third stage according to the second-stage test result, and obtaining the parameters related to the third stage to determine the final test result is described in detail. The specific contents of steps S210 to S230 are substantially the same as steps S110 to S130 in the first embodiment, and therefore will not be described again in this embodiment. As shown in FIG. 5, the method includes the following steps.

In step S210, a switch state of guide vanes of the pumped storage engine is obtained.

In step S220, the pumping start of the engine is controlled to enter a first stage according to the switch state of the guide vanes, and the parameters related to the first stage are obtained to determine a first-stage test result.

Optionally, controlling the pumping start of the engine to enter the first stage according to the switch state of the guide vanes includes: determining whether the switch state of the guide vanes indicates that the guide vanes are closed, and controlling, if the switch state of the guide vanes indicates that the guide vanes are closed, the speed of the engine to increase to a first specified speed directly through a converter, to enable the pumping start of the engine to enter the first stage; and controlling, if the switch state of the guide vanes does not indicate that the guide vanes are closed, the guide vanes to be closed through a governor, and controlling, when the switch state of the guide vanes indicates that the guide vanes are closed, the speed of the engine to increase to the first specified speed through the converter, to enable the pumping start of the engine to enter the first stage.

Optionally, obtaining the parameters related to the first stage to determine the first-stage test result, includes: calculating a product of a voltage and a current for each phase to obtain a power for each phase, and determining, when the power for each phase is negative, that the engine has a normal conversion; inputting the first-stage speed set into a predefined rising rate algorithm to calculate a first rising rate of the speed, and determining, when the first rising rate of the speed is within a first specified range, that the engine has a good first rising performance; and determining, when the engine has the normal conversion and the good first rising performance, that the first-stage test result is good performance.

In step S230, the pumping start of the engine is controlled to enter the second stage according to the first-stage test result, and parameters related to the second stage are obtained to determine a second-stage test result.

Optionally, controlling the pumping start of the engine to enter the second stage according to the first-stage test result includes: controlling, when the first-stage test result is good performance, the speed of the engine to increase from a first specified speed to a second specified speed through a converter, to enable the pumping start of the engine to enter the second stage.

Optionally, obtaining the parameters related to the second stage to determine the second-stage test result includes: inputting the second-stage speed set into a predefined rising rate algorithm to calculate a second rising rate of the speed, and determining, when the second rising rate of the speed is within a second specified range, that the engine has a good second rising performance; extracting a maximal vibration value corresponding to each direction among the second-stage vibration values, and determining, when the maximal vibration value is less than or equal to a corresponding vibration threshold, that the engine has a good second-stage vibration performance; extracting a maximal swing value among the second-stage swing values, and determining, when the maximal swing value is less than or equal to a threshold, that the engine has a good second-stage swing performance; and determining, when the engine has the good second rising performance, the good second-stage vibration performance, and the good second-stage swing performance, that the second-stage test result is good performance.

In step S240, the pumping start of the engine is controlled to enter a third stage according to the second-stage test result.

Optionally, controlling the pumping start of the engine to enter the third stage according to the second-stage test result includes: controlling, when the second-stage test result is good performance, the speed of the engine to increase from a second specified speed to a third specified speed through a converter, to enable the pumping start of the engine to enter the third stage.

The third specified speed can be 100%-105% Ne, the strategy of formula (3) is adopted, to control the speed of the engine increase to the third specified speed through the converter and the governor, which enables the pumping start of the engine to enter the third stage.

In step S250, the parameters related to the third stage are obtained. The parameters related the third stage include a third-stage speed set, a third-stage vibration value, a third-stage swing value and a maximal jump difference.

In step S260, the third-stage speed set is input into a predefined rising rate algorithm to calculate a third rising rate of the speed. When the third rising rate of the speed is within a third specified range, it is determined that the engine has a good third rising performance.

Specifically, the third-stage speed set can be input into the predefined rising rate algorithm, i.e., formula (1) and formula (2) can be adopted to calculate the third rising rate of the speed, and the third specified range can be [15,22]. When the third rising rate of the speed is within the third specified range, it is determined that the third rising performance of the engine is good. When the third rising rate of the speed does not fall within the third specified range, it is determined that the third rising performance of the engine is poor, and it is necessary to shut down the engine and optimize the parameters of the converter before starting the test again.

In step S270, a maximal vibration value corresponding to each direction among the third-stage vibration value is extracted. When the maximal vibration value is less than or equal to a corresponding vibration threshold, it is determined that the third-stage vibration performance of the engine is good.

Specifically, when the vibration performance of the engine is evaluated, vibration sensors in a X direction and a Y direction can be installed at a top cover of the pump. The number of the sensors in each direction can be 3 to 5. During the process of the speed of the engine increasing from the second specified speed to the third specified speed, the vibration measurements from each sensor are monitored and recorded in real time, and the maximal vibration value in the X direction and the maximum value in the Y direction are extracted. The vibration threshold can be set. For example, the vibration threshold in the X direction can be 0.06 mm, and the vibration threshold in the Y direction can be 0.07 mm. When the maximal vibration value is less than or equal to the corresponding vibration threshold, it is determined that the third-stage vibration performance of the engine is good. When the maximal vibration value is greater than the corresponding vibration threshold, it is determined that the third-stage vibration performance of the engine is poor. In this case, it is necessary to shut down and inspect the engine and structural components of the pump.

In step S280, a maximal swing value among the third-stage swing values is extracted. When the maximal swing value is less than or equal to a threshold, it is determined that the third-stage swing performance of the engine is good.

Specifically, when the swing performance of the engine is evaluated, swing sensors can be installed at a rotating shaft of the pump. The number of the sensors can be 4 to 6. In the process of the speed of the engine increasing from the second specified speed to the third specified speed, the swing measurements from each sensor are monitored and recorded in real time, and the maximal swing value is obtained. The swing threshold can be 0.81, where 1 is the shaft clearance.

When the maximal swing value is less than or equal to the threshold, it is determined that the third-stage swing performance of the engine is good. When the maximal swing value is greater than the threshold, it is determined that the third-stage swing performance of the engine is poor. In this case, it is necessary to shut down and inspect the engine and structural components of the pump.

In step S290, when the maximal jump difference is less than or equal to a corresponding jump threshold, it is determined that the engine has a good pumping step performance. The maximal jump difference includes a maximal power jump difference, a maximum difference of speed jump, and a maximal voltage jump difference.

Specifically, the maximal jump difference includes the maximal power jump difference, the maximal speed jump difference, and the maximal voltage jump difference, which correspond to pumping power step performance, pumping speed step performance, and machine terminal voltage step performance. When the pumping power step performance is evaluated, a current transformer and a voltage transformer are installed on the stator side of the engine to detect a line voltage and a line current of the stator, and the detected voltage and current signals are input into the power set to obtain the active power of the engine. For example, after the speed of the engine reaching the third specified speed, the active power value is recorded every 1000 ms within 8 seconds, and the maximal power jump difference between adjacent active powers is calculated. When the maximal power jump difference is less than or equal to the corresponding jump threshold, it is determined that the pumping step performance of the engine is good. When the maximal power jump difference is greater than the corresponding jump threshold, it is determined that the pumping step performance of the engine is poor, and it is necessary to shut down the engine and optimize the parameters of the converter and the governor before starting the test again.

Specifically, when the pumping step performance of the speed is evaluated, after the speed of the engine reaching the third specified speed, the speed value can be recorded every 1000 ms within 8 seconds, and the maximal speed jump difference between adjacent speed values is calculated. For example, the jump threshold of the speed can be 0.5 Ne. When the maximal speed jump difference is less than or equal to 0.5 Ne, it is determined that the pump speed rotation performance is good. When the maximal speed jump difference is greater than 0.5 Ne, it is determined that the pump speed rotation performance is poor, and it is necessary to stop and optimize the parameters of the converter and the governor before starting the test again.

Specifically, when the machine terminal voltage step performance is evaluated, a voltage transformer can be installed on the stator side of the engine to detect a line voltage value of the stator. After the speed of the engine reaching the third specified speed, the line voltage of each stator can be recorded every 1000 ms within 8 seconds, and the maximal voltage jump difference between line voltages of adjacent stators is determined. The voltage jump threshold can be 500V. When the maximal voltage jump difference is less than or equal to 500V, it is determined that pump voltage performance is good. When the maximal voltage jump difference is greater than 500V, it is determined that the pump voltage performance is poor, and it is necessary to shut down the engine and optimize the parameters of the converter and the governor before starting the test again.

In step S300, when the engine has the good third rising performance, the good third-stage vibration performance, and the good third-stage swing performance, and the good pumping step performance, it is determined that the final test result is good performance.

Specifically, when the test result of each sub-test in the third stage is good performance, the pumping start test is completed. In this case, it can be determined that the final test result is good performance. It should be noted that when any process of the test has a poor performance result, the controller can send the result to a user terminal connected to the controller for display, so that the user can check and adjust the relevant components to ensure the safety and stability of the test.

In the technical solution provided by the embodiment of the present disclosure, by changing the speed of the engine in the process of the test, the rising rate of the speed of the engine is ensured to match the opening rate of the guide vanes, to avoid large shaft eccentricity of the engine and touch between a stator and a rotor of the engine, which are caused by large vibration of the engine, and to ensure the safety and stability in the process of the test.

Third Embodiment

Figure 6:
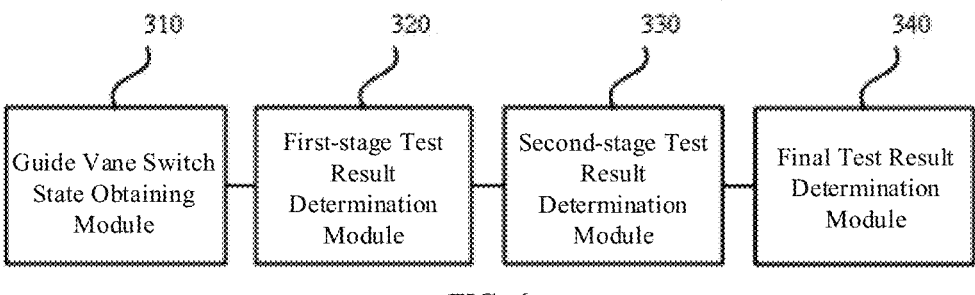
FIG. 6 is a schematic diagram illustrating a configuration of a device for a pumping start test for a pumped storage engine according to a third embodiment of the present disclosure.

FIG. 6 is a schematic diagram illustrating a configuration of a device for a pumping start test for a pumped storage engine according to a third embodiment of the present disclosure.

As shown in FIG. 6, the device includes: a guide vane switch state obtaining module 310 configured to obtain a switch state of guide vanes of the pumped storage engine; a first-stage test result determination module 320 configured to control the pumping start of the engine to enter a first stage according to the switch state of the guide vanes, and obtain parameters related to the first stage, to determine a first-stage test result, the parameters related to the first stage including a voltage, a current and a first-stage speed set; a second-stage test result determination module 330 configured to control the pumping start of the engine to enter a second stage according to the first-stage test result, and obtain parameters related to the second stage, to determine a second-stage test result, the parameters related to the second stage including a second-stage speed set, a second-stage vibration value and a second-stage swing value; and a final test result determination module 340 configured to control the pumping start of the engine to enter a third stage according to the second-stage test result, and obtain parameters related to the third stage to determine a final test result, the first stage, the second stage and the third stage corresponding to different speeds of the engine, and the parameters related to the third stage including a third-stage speed set, a third-stage vibration value, a third-stage swing value and a maximal jump difference.

Optionally, the first-stage test result determination module 320 specifically includes a first-stage startup unit. The first-stage startup unit is configured to: determine whether the switch state of the guide vanes indicates that the guide vanes are closed, and control, if the switch state of the guide vanes indicates that the guide vanes are closed, the speed of the engine to increase to a first specified speed directly through a converter, to enable the pumping start of the engine to enter the first stage; and control, if the switch state of the guide vanes does not indicate that the guide vanes are closed, the guide vanes to be closed through a governor, and control, when the switch state of the guide vanes indicates that the guide vanes are closed, the speed of the engine to increase to the first specified speed through the converter, to enable the pumping start of the engine to enter the first stage.

Optionally, the first-stage test result determination module 320 specifically includes a first-stage test result determination unit. The first-stage test result determination unit is configured to calculate a product of a voltage and a current for each phase to obtain a power for each phase, and determine, when the power for each phase is negative, that the engine has a normal conversion; input the first-stage speed set into a predefined rising rate algorithm to calculate a first rising rate of the speed, and determine, when the first rising rate of the speed is within a first specified range, that the engine has a good first rising performance; and determine, when the engine has the normal conversion and the good first rising performance, that the first-stage test result is good performance.

Optionally, the second-stage test result determination module 330 specifically includes a second-stage startup unit. The second-stage startup unit is configured to control, when the first-stage test result is good performance, the speed of the engine to increase from a first specified speed to a second specified speed through a converter, to enable the pumping start of the engine to enter the second stage.

Optionally, the second-stage test result determination module 330 specifically includes a second-stage test result determination unit. The second-stage test result determination unit is configured to: input the second-stage speed set into a predefined rising rate algorithm to calculate a second rising rate of the speed, and determine, when the second rising rate of the speed is within a second specified range, that the engine has a good second rising performance; extract a maximal vibration value corresponding to each direction among the second-stage vibration values, and determine, when the maximal vibration value is less than or equal to a corresponding vibration threshold, that the engine has a good second-stage vibration performance; extract a maximal swing value among the second-stage swing values, and determine, when the maximal swing value is less than or equal to a threshold, that the engine has a good second-stage swing performance; and determine, when the engine has the good second rising performance, the good second-stage vibration performance, and the good second-stage swing performance, that the second-stage test result is good performance.

Optionally, the final test result determination module 340 specifically includes a third-stage startup unit. The third-stage startup unit is configured to control, when the second-stage test result is good performance, the speed of the engine to increase from a second specified speed to a third specified speed through a converter, to enable the pumping start of the engine to enter the third stage.

Optionally, the final test result determination module 340 specifically includes a final test result determination unit. The final test result determination unit is configured to input the third-stage speed set into a predefined rising rate algorithm to calculate a third rising rate of the speed, and determine, when the third rising rate of the speed is within a third specified range, that the engine has a good third rising performance; extract a maximal vibration value corresponding to each direction among the third-stage vibration values, and determine, when the maximal vibration value is less than or equal to a corresponding threshold, that the engine has a good third-stage vibration performance; extract a maximal swing value among the third-stage swing values, and determine, when the maximal swing value is less than or equal to a threshold, that the engine has a good third-stage swing performance; determine, when the maximal jump difference is less than or equal to a corresponding jump threshold, that the engine has a good pumping step performance, the maximal jump difference comprising a maximal power jump difference, a maximum difference of speed jump, and a maximal voltage jump difference; and determine, when the engine has the good third rising performance, the good third-stage vibration performance, the good third-stage swing performance, and the good pumping step performance, that the final test result is good performance.

In the technical solution provided by the embodiment of the present disclosure, by changing the speed of the engine in the process of the test, an rising rate of the speed of the engine is ensured to match an opening rate of the guide vanes, to avoid large shaft eccentricity of the engine and touch between a stator and a rotor of the engine, which are caused by large vibration of the engine, and to ensure the safety and stability in the process of the test.

The device for the pumping start test for the pumped storage engine provided by the embodiment of the present disclosure can execute the method for the pumping start test for the pumped storage engine provided by any embodiment of the present disclosure, has the corresponding functional modules to execute the method, and has the same beneficial effects as the method.

Forth Embodiment

Figure 7:
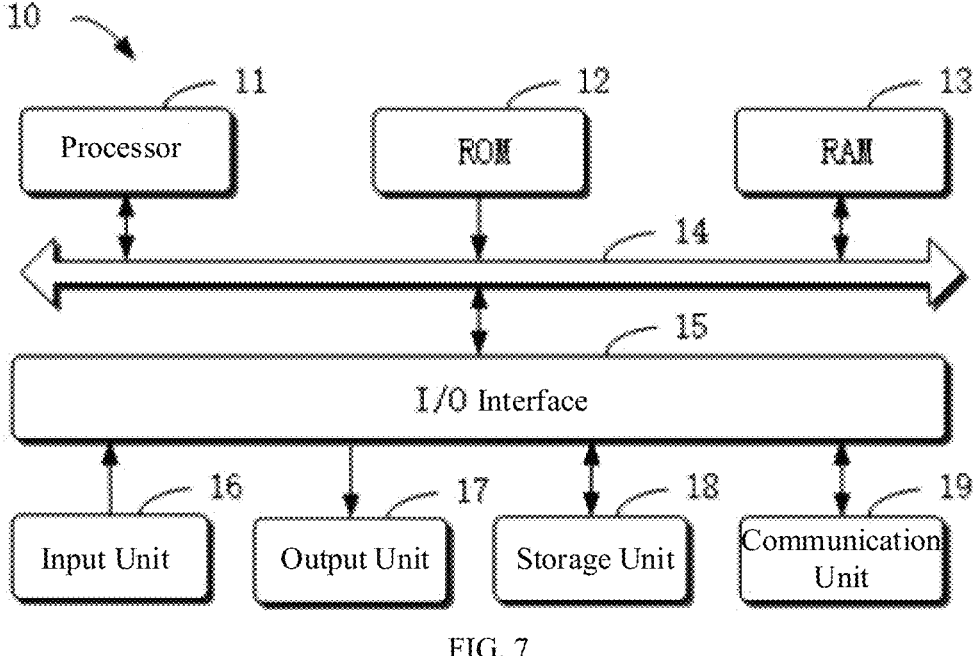
FIG. 7 is a schematic diagram illustrating a configuration of an electronic apparatus that implements the method for the pumping start test for the pumped storage engine according to embodiments of the present disclosure.

FIG. 7 is a schematic diagram illustrating a configuration of an electronic apparatus 10 that can be adopted to implement an embodiment of the present disclosure. The electronic apparatus is intended to refer to various forms of digital computers, such as laptop computers, desktop computers, workstations, personal digital assistants, servers, blade servers, mainframe computers, and other suitable computers. The electronic apparatus may also refer to various forms of mobile devices, such as personal digital assistants, cellular phones, smartphones, wearable devices (e.g., helmets, glasses, watches, etc.), and other similar computing devices. The components shown herein, their connections and relationships, and their functions are examples only and are not intended to limit the implementation of the present disclosure described and/or claimed herein.

As shown in FIG. 7, the electronic apparatus 10 includes at least one processor 11, and a memory communicatively connected to the at least one processor 11, such as a read-only memory (ROM) 12, a random access memory (RAM) 13, etc. The memory stores a computer program that can be executed by the at least one processor. The processor 11 can perform various appropriate actions and processing based on the computer program stored in the read-only memory (ROM) 12 or loaded from a storage unit 18 into the RAM 13. In the RAM 13, various program and data required for the operation of the electronic apparatus 10 may also be stored. The processor 11, the ROM 12 and the RAM 13 are connected to each other through a bus 14. An input/output (I/O) interface 15 is also connected to the bus 14.

A plurality of components in the electronic apparatus 10 are connected to the I/O interface 15, including: an input unit 16, such as a keyboard, a mouse, etc.; an output unit 17, such as various types of displays, speakers, etc.; a storage unit 18, such as a magnetic disk, an optical disk, etc.; and a communication unit 19, such as a network card, a modem, a wireless communication transceiver, etc. The communication unit 19 allows the electronic apparatus 10 to exchange information/data with other devices through computer networks such as the Internet and/or various telecommunications networks.

The processor 11 may be a variety of general and/or special purpose processing components having processing and computing capabilities. Some examples of the processor 11 include, but are not limited to, central processing units (CPUs), graphics processing units (GPUs), various specialized artificial intelligence (AI) computing chips, various processors that run machine learning model algorithms, digital signal processors (DSPs), and any appropriate processors, controllers, microcontrollers, etc. The processor 11 implements each method and process described above, such as the method for the pumping start test for the pumped storage engine.

In some embodiments, the method for the pumping start test for the pumped storage engine can be implemented as a computer program, which is tangibly included in a computer-readable storage medium, such as the storage unit 18. In some embodiments, part or all of the computer program may be loaded and/or installed onto the electronic apparatus 10 through the ROM 12 and/or the communication unit 19. When the computer program is loaded into the RAM 13 and executed by the processor 11, one or more steps of the method for the pumping start test for the pumped storage engine described above may be performed. Alternatively, in other embodiments, the processor 11 may be configured to perform the method for the pumping start test for the pumped storage engine in any other suitable manner (e.g., by means of firmware).

Various implementations of the systems and techniques described above may be implemented in digital electronic circuit systems, integrated circuit systems, field programmable gate arrays (FPGAs), application specific integrated circuits (ASICs), application specific standard products (ASSPs), systems of system-on-a-chip (SOC), load programmable logic devices (CPLD), computer hardware, firmware, software, and/or combinations thereof. These various embodiments may include: implementation in one or more computer programs that may be implemented and/or interpreted on a programmable system including at least one programmable processor, which may be a dedicated or general-purpose programmable processor, that may receive data and instructions from the storage system, the at least one input device, and the at least one output device, and transmit the data and instructions to the storage system, the at least one input device, and the at least one output device.

Computer programs for implementing the method according to the present disclosure may be written in any combination of one or more programming languages. These computer programs may be provided to a processor of a general-purpose computer, a special-purpose computer, or other programmable data processing device such that the computer program when executed by the processor causes the functions/operations set forth in the flowchart and/or the block diagram to be performed. The computer program may be executed entirely on the machine, partially on the machine, partially on the machine as a stand-alone software package and partially on a remote machine or entirely on a remote machine or server.

In the context of the present disclosure, the computer-readable storage medium may be a tangible medium that may contain or store a computer program for use by or in conjunction with an instruction execution system, device or apparatus. The computer-readable storage medium may include, but is not limited to, an electronic, magnetic, optical, electromagnetic, infrared, or semiconductor system, device, or apparatus, or any suitable combination of the foregoing. Alternatively, the computer-readable storage medium may be a machine-readable signalling medium. More specific examples of machine-readable storage media may include an electrical connection based on one or more wires, aa portable computer disc, a hard disc, a random access memory (RAM), a read-only memory (ROM), an erasable programmable read-only memory (EPROM or flash memory), an optical fiber, a convenient compact disc read-only memory (CD-ROM), an optical storage device, a magnetic storage device, or any suitable combination thereof.

To provide interaction with a user, the systems and techniques described herein may be implemented on an electronic apparatus having: a display device (e.g., a CRT (cathode ray tube) or LCD (liquid crystal display) monitor) for displaying information to the user; and a keyboard and a pointing device (e.g., a mouse or a trackball) by which the user can provide input to the electronic apparatus. Other types of devices may also be used to provide interaction with the user. For example, the feedback provided to the user may be any form of sensory feedback (e.g., visual feedback, auditory feedback, or haptic feedback). The input from the user may be received in any form including acoustic input, voice input, or, haptic input.

The systems and techniques described herein may be implemented in a computing system that includes a back-end component (e.g., as a data server), or a computing system that includes a middleware component (e.g., an application server), or a computing system that includes a front-end component (e.g., a user's computer that has a graphical user interface or web browser through which a user can interact with any of the implementations of the systems and techniques described herein), or any combination of such back-end, middleware, or front-end components. embodiments of the systems and techniques described herein), or in a computing system that includes any combination of such back-end components, middleware components, or front-end components. The components of the system may be interconnected via digital data communications (e.g., a communications network) in any form or medium. Examples of communication networks include: a local area network (LANs), a wide area network (WANs), a blockchain network, and the Internet.

The computing system may include a client and a server. The client and the server are generally remote from each other and typically interact over a communication network. The client-server relationship is created by computer programs that run on corresponding computers and have a client-server relationship with each other. The server can be a cloud server, also known as a cloud computing server or cloud host, which is a host product in the cloud computing service system to solve the defects of the traditional physical host and VPS services, which are difficult to manage and weak in business scalability.

It should be understood that steps may be reordered, added or deleted using various forms of the process shown above. For example, the steps described in the present disclosure may be performed in parallel or sequentially or in a different order, as long as the desired result of the technical solution of the present disclosure can be achieved, which is not limited herein.

The above specific embodiments are not intended to limit the scope of protection of the present disclosure. It should be appreciated by persons of ordinary skill in the art that various modifications, combinations, sub-combinations and substitutions may be made according to design requirements and other factors. Any modifications, equivalent substitutions and improvements, etc. made within the spirit and principles of the present disclosure shall be included in the scope of protection of the present disclosure.

The invention claimed is:

1. A method for a pumping start test for a pumped storage engine, the method comprising:

obtaining a switch state of guide vanes of the pumped storage engine;

controlling the pumping start of the engine to enter a first stage according to the switch state of the guide vanes, and obtaining parameters related to the first stage, to determine a first-stage test result, wherein the parameters related to the first stage include a voltage, a current and a first-stage speed set;

controlling the pumping start of the engine to enter a second stage according to the first-stage test result, and obtaining parameters related to the second stage, to determine a second-stage test result, wherein the parameters related to the second stage include a second-stage speed set, a second-stage vibration value and a second-stage swing value; and controlling the pumping start of the engine to enter a third stage according to the second-stage test result, and obtaining parameters related to the third stage, to determine a final test result, wherein the first stage, the second stage and the third stage correspond to different speeds of the engine, and the parameters related to the third stage include a third-stage speed set, a third-stage vibration value, a third-stage swing value and a maximal jump difference.

2. The method of claim 1, wherein controlling the pumping start of the engine to enter the first stage according to the switch state of the guide vanes includes:

determining whether the switch state of the guide vanes indicates that the guide vanes are closed, and controlling, if the switch state of the guide vanes indicates that the guide vanes are closed, the speed of the engine to increase to a first specified speed directly through a converter, to enable the pumping start of the engine to enter the first stage; and if the switch state of the guide vanes does not indicate that the guide vanes are closed, controlling the guide vanes to be closed through a governor, and when the switch state of the guide vanes indicates that the guide vanes are closed, controlling the speed of the engine to increase to the first specified speed through the converter, to enable the pumping start of the engine to enter the first stage.

3. The method of claim 1, wherein obtaining the parameters related to the first stage, to determine the first-stage test result includes:

calculating a product of a voltage and a current for each phase to obtain a power for each phase, and determining, when the power for each phase is negative, that the engine has a normal conversion;

inputting the first-stage speed set into a predefined rising rate algorithm to calculate a first rising rate of the speed, and determining, when the first rising rate of the speed is within a first specified range, that the engine has a good first rising performance; and determining, when the engine has the normal conversion and the good first rising performance, that the first-stage test result is good performance.

4. The method of claim 3, wherein controlling the pumping start of the engine to enter the second stage according to the first-stage test result includes:

when the first-stage test result is good performance, controlling the speed of the engine to increase from a first specified speed to a second specified speed through a converter, to enable the pumping start of the engine to enter the second stage.

5. The method of claim 1, wherein obtaining the parameters related to the second stage, to determine the second-stage test result includes:

inputting the second-stage speed set into a predefined rising rate algorithm to calculate a second rising rate of the speed, and determining, when the second rising rate of the speed is within a second specified range, that the engine has a good second rising performance;

extracting a maximal vibration value corresponding to each direction among the second-stage vibration values, and determining, when the maximal vibration value is less than or equal to a corresponding vibration threshold, that the engine has a good second-stage vibration performance;

extracting a maximal swing value among the second-stage swing values, and determining, when the maximal swing value is less than or equal to a swing threshold, that the engine has a good second-stage swing performance; and when the engine has the good second rising performance, determining the good second-stage vibration performance, and the good second-stage swing performance, that the second-stage test result is good performance.

6. The method of claim 5, wherein controlling the pumping start of the engine to enter the third stage according to the second-stage test result includes:

when the second-stage test result is good performance, controlling the speed of the engine to increase from a second specified speed to a third specified speed through a converter, to enable the pumping start of the engine to enter the third stage.

7. The method of claim 1, wherein obtaining the parameters related to the third stage, to determine the final test result includes:

inputting the third-stage speed set into a predefined rising rate algorithm to calculate a third rising rate of the speed, and determining, when the third rising rate of the speed is within a third specified range, that the engine has a good third rising performance;

extracting a maximal vibration value corresponding to each direction among the third-stage vibration values, and determining, when the maximal vibration value is less than or equal to a corresponding vibration threshold, that the engine has a good third-stage vibration performance;

extracting a maximal swing value among the third-stage swing values, and determining, when the maximal swing value is less than or equal to a swing threshold, that the engine has a good third-stage swing performance;

determining, when the maximal jump difference is less than or equal to a corresponding jump threshold, that the engine has a good pumping step performance, the maximal jump difference comprising a maximal power jump difference, a maximum difference of speed jump, and a maximal voltage jump difference; and determining, when the engine has the good third rising performance, the good third-stage vibration performance, the good third-stage swing performance, and the good pumping step performance, that the final test result is good performance.

8. A device for a pumping start test for a pumped storage engine, the device comprising:

a guide vane switch state obtaining module configured to obtain a switch state of guide vanes of the pumped storage engine;

a first-stage test result determination module configured to control the pumping start of the engine to enter a first stage according to the switch state of the guide vanes, and obtain parameters related to the first stage, to determine a first-stage test result, wherein the parameters related to the first stage include a voltage, a current and a first-stage speed set;

a second-stage test result determination module configured to control the pumping start of the engine to enter a second stage according to the first-stage test result, and obtain parameters related to the second stage, to determine a second-stage test result, wherein the parameters related to the second stage include a second-stage speed set, a second-stage vibration value and a second-stage swing value; and a final test result determination module configured to control the pumping start of the engine to enter a third stage according to the second-stage test result, and obtain parameters related to the third stage to determine a final test result, wherein the first stage, the second stage and the third stage correspond to different speeds of the engine, and the parameters related to the third stage include a third-stage speed set, a third-stage vibration value, a third-stage swing value and a maximal jump difference.

9. An electronic apparatus, comprising:

at least one processor; and a memory communicatively connected to the at least one processor, wherein the memory stores a computer program executable by the at least one processor, and the computer program, when executed by the at least one processor, causes the at least one processor to implement the method of claim 1.

10. A computer storage medium storing computer instructions configured to cause, when executed by a processor, the processor to implement the method of claim 1.

* * * * *